United States Patent
Riepertinger

(10) Patent No.: US 7,308,765 B2
(45) Date of Patent: Dec. 18, 2007

(54) ANGLE-MEASURING ARRANGEMENT

(75) Inventor: Sebastian Riepertinger, Söchtenau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/289,861

(22) Filed: Nov. 30, 2005

(65) Prior Publication Data

US 2006/0131489 A1   Jun. 22, 2006

(30) Foreign Application Priority Data

Dec. 17, 2004   (DE) ............... 10 2004 060 863

(51) Int. Cl.
   *G01B 7/30* (2006.01)
(52) U.S. Cl. .................... 33/1 N; 33/1 PT
(58) Field of Classification Search .............. 33/1 L, 33/1 N, 1 PT, 706, 707, 708; 250/231.13, 250/231.14

See application file for complete search history.

(56) References Cited

U.S. PATENT DOCUMENTS

| | | | | |
|---|---|---|---|---|
| 4,388,758 A | * | 6/1983 | Ernst et al. ............... | 33/1 PT |
| 4,495,700 A | * | 1/1985 | Ernst ....................... | 33/1 N |
| 5,007,159 A | * | 4/1991 | Brown et al. ............. | 29/622 |
| 5,657,544 A | | 8/1997 | Ota et al. ................. | 33/1 N |
| 6,688,006 B2 | * | 2/2004 | Itomi ....................... | 33/1 N |
| 2003/0136443 A1 | | 7/2003 | Wain et al. ............... | 137/38 |
| 2004/0104889 A1 | | 6/2004 | Fehrenbach et al. ....... | 345/156 |

FOREIGN PATENT DOCUMENTS

| | | |
|---|---|---|
| EP | 0 776 065 A1 | 5/1997 |
| WO | WO 2004/017026 A1 | 2/2004 |

* cited by examiner

*Primary Examiner*—R. Alexander Smith
(74) *Attorney, Agent, or Firm*—Brinks Hofer Gilson & Lione

(57) ABSTRACT

An angle-measuring arrangement that includes a base body, a code disk, which is rotatable relative to the base body around an axis A and a contact area, which is laid out in such a way that electrical current or electrical signals can be conducted into the angle-measuring arrangement from a further stationary body. The contact area is arranged to be stationary with respect to the base body and has an identical electrical potential at every point of the contact area. The contact area is also configured in such a way that a first point is defined by polar coordinates R and $\alpha_1$, and a second point by polar coordinates R and $\alpha_2$, wherein the first and second points are located on the contact area, and R is a distance of an identical size of the first and second points from the axis A, and $\alpha_1$ and $\alpha_2$ represent different angles.

7 Claims, 3 Drawing Sheets

ANGLE-MEASURING ARRANGEMENT

Applicant claims, under 35 U.S.C. § 119, the benefit of priority of the filing date of Dec. 17, 2004 of a German patent application, copy attached, Ser. No. 10 2004 060 863.6, filed on the aforementioned date, the entire contents of which is incorporated herein by reference.

BACKGROUND OF THE INVENTION

1. Field of the Invention

The present invention relates to an angle-measuring arrangement, including a base body, a code disk, which is rotatable relative to the base body around an axis A, and a contact area, which is laid out in such a way that electrical current or electrical signals can be conducted into the angle-measuring arrangement from a further stationary body.

2. Discussion of Related Art

Angle-measuring arrangements, often also called angle encoders, are used for measuring rotary movements of a rotatably seated body, in particular a shaft, during one or more revolutions. The rotary movement is then detected in an incremental or absolute way. It is also possible to measure linear movements by an angle-measuring arrangement in connection with toothed racks or gear wheels.

An operating voltage is supplied to the angle-measuring arrangement, and the measurement signals are picked up via connecting cables and are fed to an electronic follow-up device. In known angle measuring arrangements an opening in a cap of the angle-measuring arrangement is provided for this, through which the connecting cable can be conducted to the angle-measuring arrangement and there connected with a suitable electrical connector unit.

However, signals or electrical information from a further body, for example a motor, are supplied to such angle-measuring arrangements or angle encoders and, after they have been processed, are passed on to the electronic follow-up device if desired. Then the signals are conducted to the angle-measuring arrangement via separate signal lines, which must be connected with the angle-measuring arrangements. Known connectors of this type are expensive to mount and limit the flexibility of the installed position of the angle-measuring arrangements.

OBJECTS AND SUMMARY OF THE INVENTION

An object of the present invention is based on providing an angle-measuring arrangement of the type mentioned at the outset, which makes possible a simple, dependable and rapid assembly, wherein the angle-measuring arrangement can be mounted at different angular positions while providing identical functions.

In accordance with the present invention, this object is attained by creating an angle-measuring arrangement that includes a base body, a code disk, which is rotatable relative to the base body around an axis A and a contact area, which is laid out in such a way that electrical current or electrical signals can be conducted into the angle-measuring arrangement from a further stationary body. The contact area is arranged to be stationary with respect to the base body and has an identical electrical potential at every point of the contact area. The contact area is also configured in such a way that a first point is defined by polar coordinates R and $\alpha 1$, and a second point by polar coordinates R and $\alpha 2$, wherein the first and second points are located on the contact area, and R is a distance of an identical size of the first and second points from the axis A, and $\alpha 1$ and $\alpha 2$ represent different angles.

Accordingly, the angle-measuring arrangement includes a base body, a code disk, which is rotatable relative to the base body around an axis A, and a contact area, which is laid out in such a way that electrical current or electrical signals can be conducted into the angle-measuring arrangement from a further stationary body. Here, the contact area is arranged stationary in relation to the base body. The contact area furthermore has the same electrical potential at every point. The contact area is configured in such a way that a first point P1 can be defined by the polar coordinates R and $\alpha 1$, as well as a second point P2 by the polar coordinates R and $\alpha 2$, wherein both points P1 and P2 lie on the contact area. In this connection, R represents the distance of the same size of the points P1 and P2 from the axis A, while the angles $\alpha 1$ and $\alpha 2$ are of different size.

In accordance with a further development of the present invention, the contact area includes a ring body or a ring segment.

The angle-measuring system is advantageously configured in such a way that it can be fixed in place on a further body with the aid of several fastening devices. Here, flange bores or flange slits can be employed as fastening devices. The fastening devices are preferably arranged along a circular line, whose center rests on the axis A. In this case the angular offset of adjoining fastening devices corresponds to the difference between $\alpha 1$ and $\alpha 2$.

In an alternative embodiment of the present invention, the contact area includes at least one pad and/or at least one strip conductor on a circuit board. This type of construction is particularly advantageous if an inductive measuring principle is used for the determination of the angular position of a shaft. Therefore the contact area can be a continuous surface, but can also include several individual, geometrically separated surfaces.

As already mentioned, the contact area has the same electrical potential at every point. In case the contact area is constituted of several pads or several separate surfaces, this means that these surfaces are electrically connected with each other so that a compensation of the potential between them takes place. If the contact area is constituted by a one-piece body, it has the same electrical potential at every point, provided the body is capable of electrical conductivity. As a rule, the contact area is electrically connected with an input circuit of the angle-measuring arrangement.

The end of the external signal line or electrical line, which works together with the contact area, is advantageously designed as a resilient component for making possible a dependable electrical contact.

In accordance with a further aspect of the present invention, at least one spacer is provided for optimizing the easy plugging and functioning of an electrical coupling, as well as for improving the sealing of the angle-measuring arrangement, with whose aid the cap is positioned relative to the printed circuit board in such as way that the opening is aligned in relation to the electrical coupling element. It is possible by this exact spatial coordination between the cap and the printed circuit board to reproducibly achieve a high degree of sealing in the area of the electrical coupling.

Furthermore, the angle-measuring arrangement may include structure which finally assures an unequivocal angular orientation assignment between the cap and an electrical coupling element. The above mentioned structure may include, for example, a positive connection between a base body of the angle-measuring arrangement and the cap.

Alternatively it is also possible to provide alignment pins directly on the cap (or they can be components of the cap) which, together with corresponding bores in the printed circuit board, results in a conformal assembly. Thus, the cap has elements here which work together with the printed circuit board in such a way that a relative angular position between the cap and the printed circuit board can be assured by a positive connection.

Such angle-measuring arrangements are often components of a data net with, for example, an ethernet architecture, to which they provide measured data, but also receive data from it. For this reason the electrical coupling elements are in this connection often known network plugs or network sockets, for example so-called RJ45 plugs, or corresponding sockets.

Further characteristics and advantages of the present invention will become apparent in the course of the following description of an exemplary embodiment by the drawings.

DETAILED DESCRIPTION OF THE PREFERRED EMBODIMENTS

Figure 1:
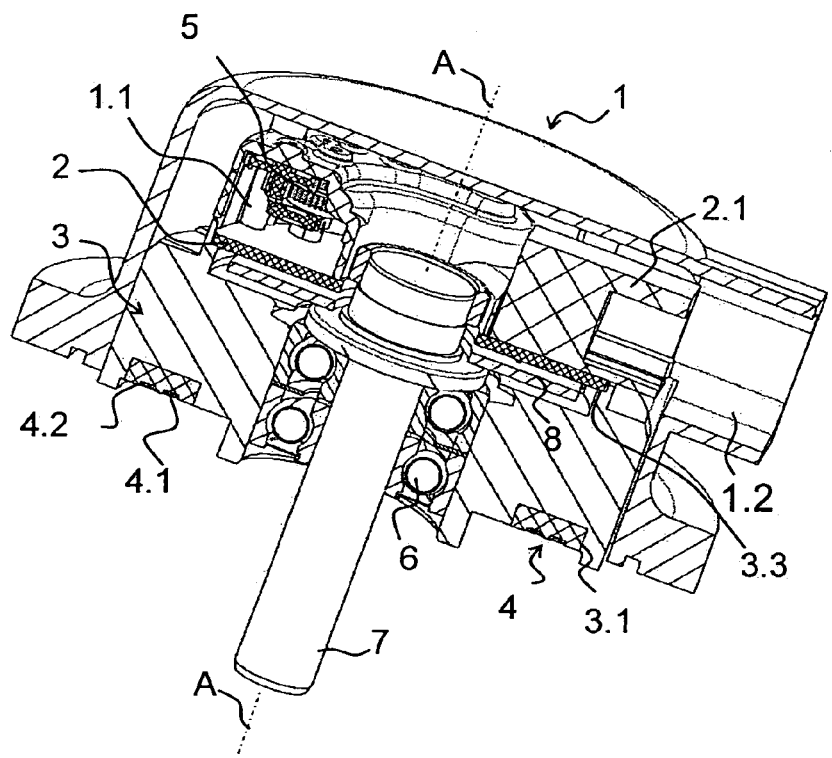
FIG. 1 is a perspective sectional plan view of an embodiment of an angle-measuring arrangement in accordance with the present invention.
Figure 2:
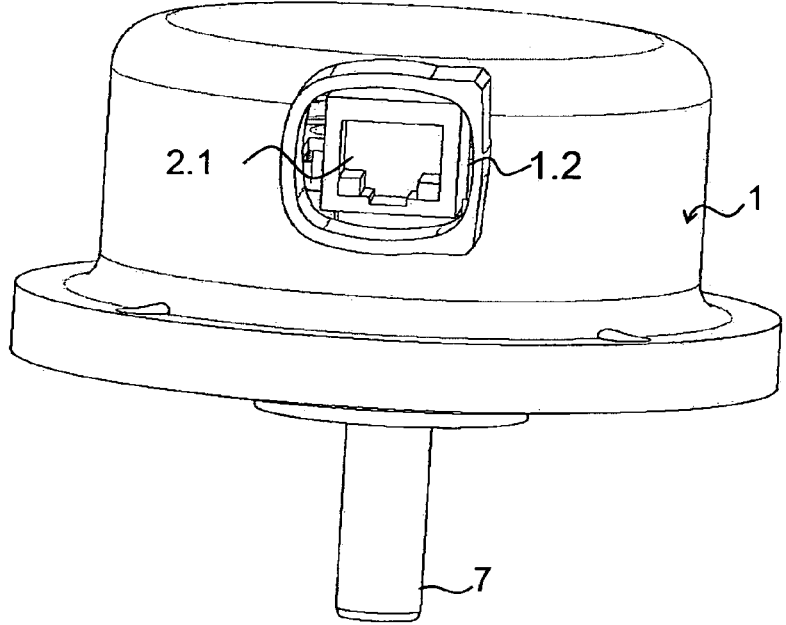
FIG. 2 is a perspective plan view of the angle-measuring arrangement of FIG. 1.
Figure 3:
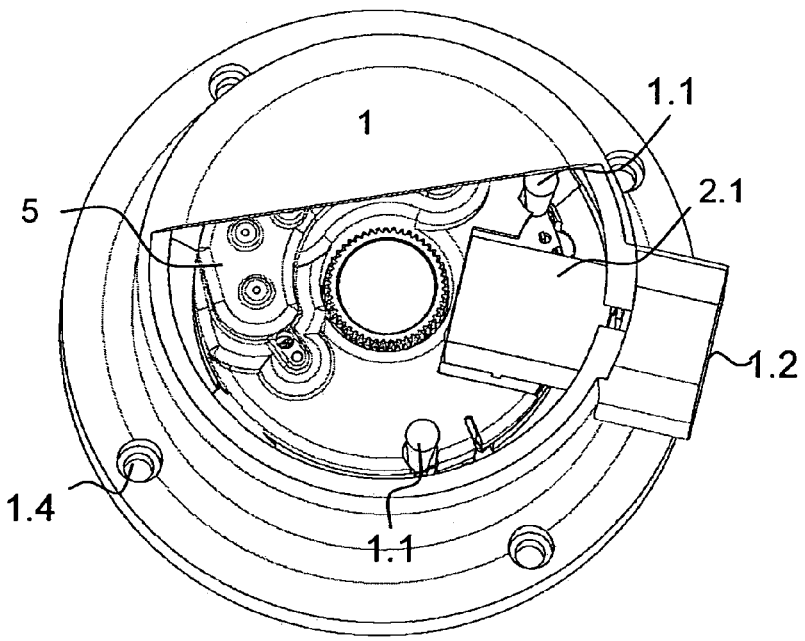
FIG. 3 is a perspective plan view of the angle-measuring arrangement of FIG. 1 with and embodiment of a cap in a sectional view in accordance with the present invention.

The angle-measuring arrangement represented in FIGS. 1 to 5 has a shaft 7 for a connection with a body to be measured. The connection between the shaft 7 and the body to be measured is realized by a connector in the form of a fastening screw, for example, which protrudes through the shaft 7.

The angle-measuring arrangement itself is fastened via a cap 1 on a further body by flange bores 1.4. The body to be measured is a motor shaft, for example, and the further body a stationary motor housing. Angle-measuring arrangements designed for these applications are also often called angle encoders.

The base body 3 has a recess 3.1, into which a ring-shaped non-conducting insulating body 4 has been placed. A first ring contact 4.1 and a second ring contact 4.2 are located in this insulating body and include an electrically conductive material. The ring contacts 4.1, 4.2 are concentrically arranged in relation to the shaft 7.

The shaft 7 is rotatably seated in a known manner in the base body 3 with the aid of bearings 6, wherein a code disk 8 arranged in the interior of the angle-measuring arrangement is fastened on the shaft 7, and the shaft 7 drives one or several further code disks via a gear 5. The code disk 8 therefore is rotatable around the axis A, and in the example represented is photo-electrically scanned by a scanning device. Corresponding light-sensitive detectors are located on a printed circuit board 2 on which, inter alia, electrical components for signal formation—for example amplifying and digitizing—of the scanning signals provided by the detectors. Besides this electronic measuring arrangement, an electrical coupling element is furthermore located on the printed circuit board, in the example shown a socket 2.1, in which an RJ45 plug can be received. The socket 2.1 is positioned in an exactly fitting manner on the printed circuit board 2.

Figure 4:
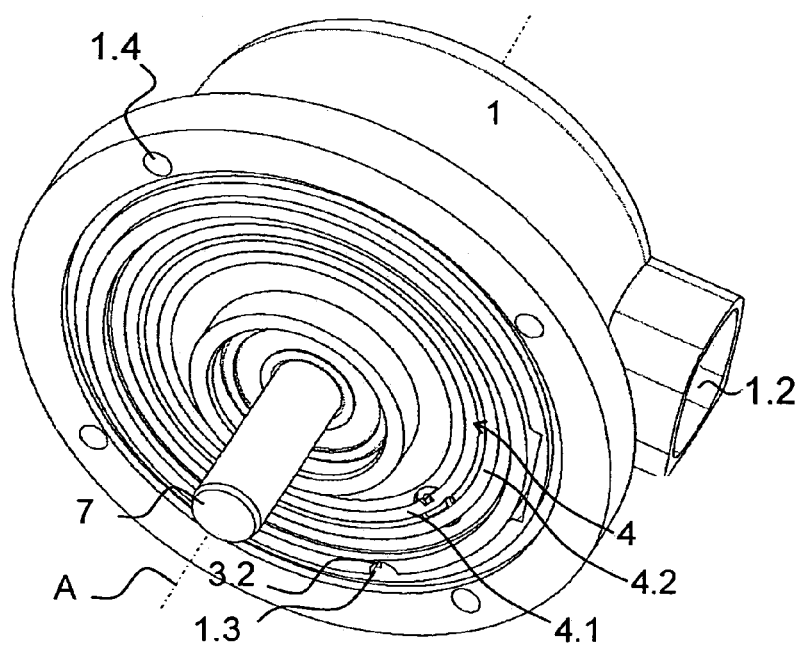
FIG. 4 is a further perspective sectional plan view of the angle-measuring arrangement of FIGS. 1-3.
Figure 5:
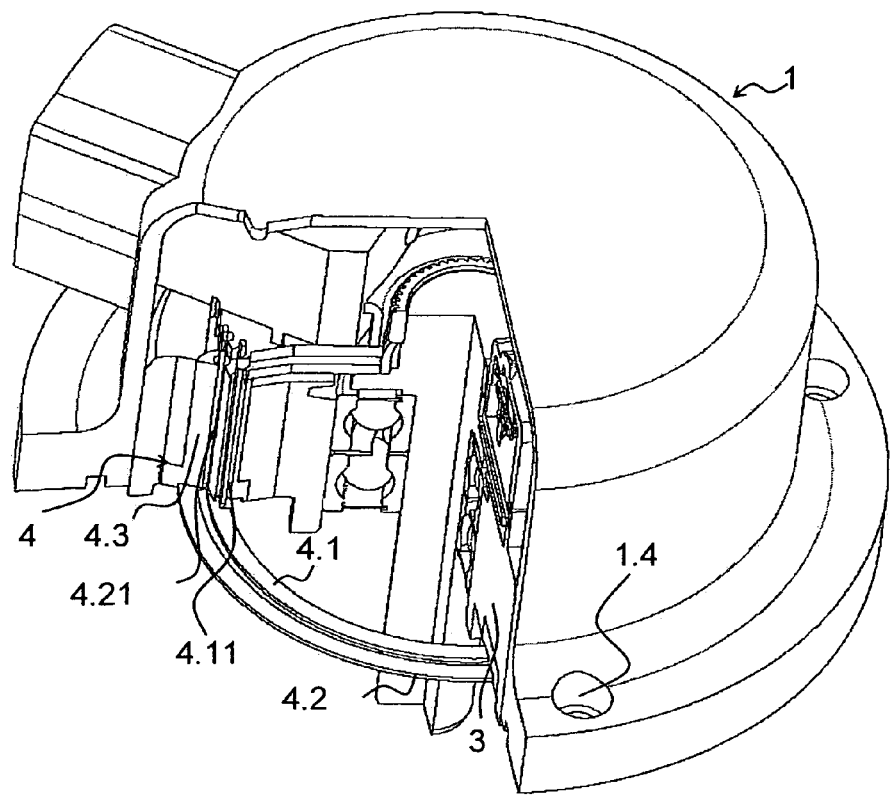
FIG. 5 is a further perspective plan view of the angle-measuring arrangement of FIGS. 1-3.

A cup-shaped cap 1 is provided for the protection of the angle-measuring arrangement and its electronic measuring arrangement, which is fastened on the base body 3 by being clamped over the circumference. In the example represented, this connection is a press connection. So that an unequivocal assignment with respect to the angular position between the cap 1 and the base body 3 is assured, the base body 3 has a fitting recess 3.2. The cap 1 is oriented in such a way in the course of assembly, that a protrusion 1.3 is received in the fitting recess 3.2 (FIG. 4). The cap 1 furthermore has three spacers 1.1 as integral components, as well as an opening 1.2. In the exemplary embodiment represented, the cap 1 is designed as a molded element, wherein for increasing the dimensional accuracy of the length of the spacers 1.1 their end faces had been machined. An extremely accurate position of the end faces of the spacers 1.1 in relation to the opening 1.2 is achieved in this way.

An appropriate plug can be inserted into the socket 2.1 through the opening 1.2. The wall of the opening 1.2 is simultaneously used as a guide for the plug.

Such angle-measuring arrangements, or angle encoders, are often employed in comparatively rough industrial environments, because of which it is important that the cap 1 sealingly encloses the interior of the angle-measuring arrangement. In this connection, the area of the plug connection, or of the opening 1.2 and socket 2.1, is particularly critical. It is not possible to achieve a high degree of seal in this area if the position of the socket 2.1 in relation to the opening 1.2 in the cap 1 has too large tolerances.

As already mentioned, the socket 2.1 is placed in an exactly fitting manner on the printed circuit board 2, but the printed circuit board itself has tolerances in regard to its being level and to its thickness. These tolerances are comparatively large. For this reason, a plug of conventional construction would in general be positioned obliquely or tilted in relation the socket 2.1 through the opening 1.2 used as a guide. This tilting can be so large that the plug connection cannot be made, or creates electrically unreliable contacts. Moreover, even if a plug connection can still be established, open gaps can be created in the area of the plug connection, which result in leaks.

An exact spatial coordination between the socket 2.1 and the opening 1.2 is now achieved in that the spacers 1.1 are supported on the printed circuit board 2. The printed circuit board 2 itself rests on a printed circuit board support which, in the exemplary embodiment represented, is embodied as a collar 3.3 extending around the interior of the base body. The thickness tolerances of the printed circuit board 2 are evened out in this way, so that the opening 1.2 is placed in exactly the right position in relation to the socket 2.1 in the direction of the axis A of the shaft 7. Moreover, as already mentioned, an unequivocal assignment between the cap 1 and the base body 3 is assured because of the fitting recess 3.2 and the protrusion 1.3. In this way an accurately fitted installation of the plug in the socket 2.1 also is achieved in the tangential direction.

Often such angle-measuring arrangements or angle encoders are connected with their surroundings not only through the plug connection for which the socket 2.1 is provided but, as already described above, electrical signals or electrical current is fed to the angle-measuring arrangement through separate lines coming from the exterior. Such signals can, for example, stem from a temperature sensor (possibly a resistance sensor of the type Pt 100) in a motor to which the angle-measuring arrangement, or the cap 1 is flanged. In accordance with FIGS. 4 to 6, two contact areas are provided at the underside of the angle-measuring arrangement which, in the exemplary embodiment shown, are designed as two circulating ring contacts 4.1, 4.2. They are used for working together with resilient contact elements (not represented) of a temperature outlet of the motor. Here, the angle-measuring arrangement is designed in such a way that it can be flanged to the motor housing in different angular positions, depending on the required cable departure direction, but a contact with the signal outlets of the motor is still possible. In other words, the contact elements of the temperature outlet of the motor always encounter the ring contacts 4.1, 4.2 of the angle-measuring arrangement regardless of the angular position in which the angle-measuring device had been flanged on the motor.

Each of the ring contacts 4.1, 4.2 is designed as a one-piece sheet metal element and they are provided with a gold plating. Thus, each point on a ring contact 4.1, 4.2 has the same electrical potential.

Sheet metal strips 4.11, 4.12 are aligned parallel with respect to the axis A of the shaft 7, each of which is a component of the ring contacts 4.1, 4.2. The insulating body 4 is designed in such a way that it has an area 4.1 which is aligned parallel with respect to the axis of the shaft 7 inside the base body 3 and receives the sheet metal strips 4.11, 4.12. The sheet metal strips 4.11, 4.12 end at the printed circuit board 2 and are in contact there with corresponding strip conductors. The temperature signals are then further processed in appropriate circuits on the printed circuit board 2 and are output in the form of digital values, possibly also as analog signals, via the socket 2.1.

Figure 6:
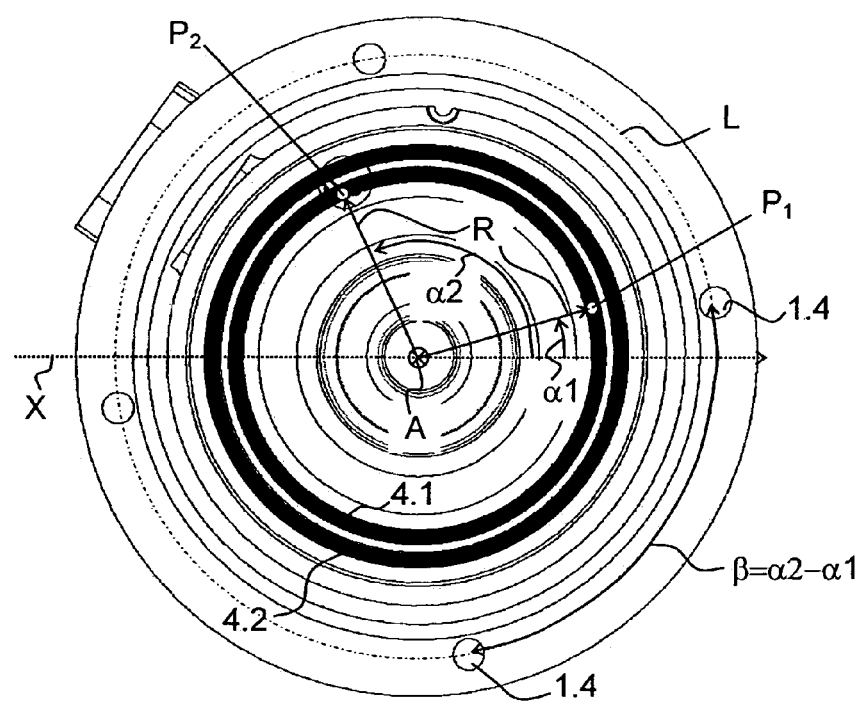
FIG. 6 is a view from above on the angle-measuring arrangement with two ring-shaped contact areas.

The geometric relationships of the ring contacts 4.1, 4.2 are represented in FIG. 6, wherein here there are two contact areas constituted by the two ring bodies 4.1, 4.2. An axis X of a polar coordinate system is represented in FIG. 6, whose origin lies on the axis A of the angle-measuring arrangement. The angle-measuring arrangement has four flange bores 1.4, which are arranged at an angular offset β of respectively 90°. So that the angle-measuring arrangement can be mounted in all four different angle positions, the contact areas, and therefore the ring bodies 4.1, 4.2 are configured in such a way that a first point $P_1$ can be defined by the polar coordinates R and $\alpha 1$, and a second point $P_2$ by the polar coordinates R and $\alpha 2$. In this case R is the distance of the same size of the points $P_1$ and $P_2$ from the axis A. Thus, the points $P_1$ and $P_2$ are located on a circle, whose center lies on the axis A. The values of the angles $\alpha 1$ and $\alpha 2$ differ. In the exemplary embodiment represented, the difference between the angles $\alpha 1$ and $\alpha 2$ is 90°. Therefore $\alpha 2 - \alpha 1 = \beta$ applies, corresponding to the distribution of the flange bores 1.4.

An analogous geometric consideration also applies to the second ring body 4.2.

The foregoing description is provided to illustrate the invention, and is not to be construed as a limitation. Numerous additions, substitutions and other changes can be made to the invention without departing from its scope as set forth in the appended claims.

I claim:

1. An angle-measuring arrangement, comprising
a base body;
a code disk, which is rotatable relative to said base body around an axis A; and
a contact area, which is laid out in such a way that electrical current or electrical signals can be conducted into said angle-measuring arrangement directly from a further stationary body that is external to said angle-measuring arrangement, wherein said contact area: is arranged to be stationary with respect to said base body; has an identical electrical potential at every point of said contact area; and is configured in such a way that a first point is defined by polar coordinates R and $\alpha 1$, and a second point by polar coordinates R and $\alpha 2$, wherein said first and second points are located on said contact area, and R is a distance of an identical size of said first and second points from said axis A, and $\alpha 1$ and $\alpha 2$ represent different angles as measured from an axis X that lies within a plane that contains said first and second points and intersects said axis A, wherein said contact area enables said angle-measuring arrangement to be mounted to said further stationary body at different angular positions while still allowing said electrical current or electrical signals to be conducted into said angle-measuring arrangement directly from contact elements of said further stationary body that directly contact each of said first and second points of said contact area.

2. The angle-measuring arrangement in accordance with claim 1, wherein said contact area comprises a ring body.

3. The angle-measuring arrangement in accordance with claim 1, wherein said angle-measuring arrangement is configured in such a way that it can be fixed in place on said further stationary body via several fastening devices, wherein said fastening devices are arranged along a circular line, and an angular offset, β., of adjoining fastening devices corresponds to a difference between $\alpha 1$ and $\alpha 2$.

4. The angle-measuring arrangement in accordance with claim 1, wherein said contact area comprises a pad on a circuit board.

5. The angle-measuring arrangement in accordance with claim 4, wherein said contact area comprises a strip conductor on said circuit board.

6. The angle-measuring arrangement in accordance with claim 1, wherein said contact area comprises a strip conductor on a circuit board.

7. The angle-measuring arrangement in accordance with claim 1, wherein said contact area is configured in such a way that a cooperation with a resilient component at an end of an external signal line is made possible.

* * * * *